US 6,742,253 B2

(12) United States Patent
Geiman et al.

(10) Patent No.: US 6,742,253 B2
(45) Date of Patent: Jun. 1, 2004

(54) PROCESS FOR ELIMINATING VERTICAL FLASH ON AN AS-FORGED CONNECTING ROD

(75) Inventors: Timothy E. Geiman, South Lyon, MI (US); Ronald Lee Trosin, Plymouth, MI (US); Henry James Knott, Ypsilanti, MI (US)

(73) Assignee: GKN Sinter Metals, Auburn Hills, MI (US)

( * ) Notice: Subject to any disclaimer, the term of this patent is extended or adjusted under 35 U.S.C. 154(b) by 225 days.

(21) Appl. No.: 09/895,988

(22) Filed: Jun. 29, 2001

(65) Prior Publication Data

US 2003/0000087 A1 Jan. 2, 2003

(51) Int. Cl.⁷ .......................... B23P 13/04; B23P 17/00
(52) U.S. Cl. ..................... 29/888.092; 29/888.09; 29/526.2; 29/33 A; 29/DIG. 18; 72/356; 72/377
(58) Field of Search ................ 29/888.09, 888.092, 29/526.2, 6.01, 33 A, DIG. 18; 72/356, 377

(56) References Cited

U.S. PATENT DOCUMENTS

| | | | |
|---|---|---|---|
| 3,169,638 A | * 2/1965 | Reinberger | |
| 3,631,585 A | 1/1972 | Stamm et al. | 29/470.3 |
| 3,785,045 A | 1/1974 | Reis | 29/527.6 |
| 3,934,324 A | 1/1976 | Hess et al. | 29/159 |
| 4,014,970 A | 3/1977 | Jahnle | 264/161 |
| 4,055,214 A | 10/1977 | Nieman | 164/241 |
| 4,166,311 A | 9/1979 | Lindstrand | 29/33 |
| 4,198,886 A | 4/1980 | Bowers et al. | 83/112 |
| 4,340,163 A | 7/1982 | Romashov et al. | 228/19 |
| 4,413,814 A | 11/1983 | Lobastov | 266/251 |
| 4,494,297 A | 1/1985 | Larsson | 29/527.6 |
| 4,587,828 A | * 5/1986 | Matsumoto et al. | |
| 4,704,241 A | 11/1987 | Boggs | 264/161 |
| 4,796,867 A | 1/1989 | Bozhko et al. | 266/51 |
| 5,059,419 A | * 10/1991 | Ruehling | |
| 5,097,710 A | 3/1992 | Palynchuk | 73/644 |
| 5,187,967 A | 2/1993 | Singh et al. | 72/340 |
| 5,353,500 A | 10/1994 | Hoag et al. | 29/888.091 |
| 5,544,413 A | 8/1996 | Stevens et al. | 29/888.092 |
| 5,878,491 A | 3/1999 | Morgen et al. | 29/888.091 |
| 5,879,223 A | 3/1999 | Frederick et al. | 451/85 |
| 6,044,685 A | 4/2000 | Delgado et al. | 72/356 |
| 6,059,640 A | 5/2000 | Stearns | 451/85 |
| 6,134,779 A | 10/2000 | Walker et al. | 29/888.092 |
| 6,151,948 A | 11/2000 | Ashworth et al. | 72/359 |
| 6,205,836 B1 | 3/2001 | Yamagata et al. | 72/359 |
| 6,592,809 B1 | 7/2003 | Anderson et al. | 419/28 |

FOREIGN PATENT DOCUMENTS

| | | |
|---|---|---|
| EP | 0 850 711 A1 | 7/1998 |
| JP | 52 068005 | 6/1977 |
| JP | 61 078527 | 4/1986 |
| JP | 63-303678 | * 12/1988 |
| JP | 02 059135 | 2/1990 |
| JP | 04-309430 | * 11/1992 |

* cited by examiner

Primary Examiner—David P. Bryant
Assistant Examiner—Eric Compton
(74) Attorney, Agent, or Firm—Woodcock Washburn LLP

(57) ABSTRACT

A presently-preferred process for manufacturing a connecting rod comprises placing a heated preform suitable for being formed into the connecting rod into a closed forge die, and forging the preform in a first forging operation while the preform is at a forging temperature to form an as-forged connecting rod having vertical flash extending therefrom. The presently-preferred process further comprises placing the as-forged connecting rod in a second forge die while the as-forged connecting rod is at a temperature substantially equal to the forging temperature, and forging the vertical flash in a second forging operation. The presently-preferred process also comprises removing the as-forged connecting rod from the second forge die, and machining the as-forged connecting rod to predetermined dimensions.

14 Claims, 21 Drawing Sheets

PROCESS FOR ELIMINATING VERTICAL FLASH ON AN AS-FORGED CONNECTING ROD

FIELD OF THE INVENTION

The present invention relates to the manufacture of a connecting rod of the type used in internal combustion engines. The invention also relates to the elimination of vertical flash on an as-forged connecting rod.

BACKGROUND OF THE INVENTION

Connecting rods are commonly manufactured using a forge die of the closed type. A closed-die forging process comprises placing a heated preform, or workpiece, between two or more punches in the forge die. The preform is compressed to plastically deform the preform into an as-forged connecting rod. The shape of the as-forged connecting rod is determined by the geometry of the punches and the amount of compressive force exerted by the forge die.

An as-forged connecting rod produced by a closed-die forging process typically includes areas of unwanted material, or flash, that project outwardly from various surfaces of the forging. Flash results from the flow of preform material into gaps that are normally present between the various components of the forge die. Flash is typically categorized as horizontal or vertical, depending on its orientation in relation to the as-forged connecting rod. Horizontal flash typically forms as a single, continuous layer of material that extends along the outer perimeter of the as-forged connecting rod. The horizontal flash is usually removed by a shearing or stamping operation using, for example, a trim die. Vertical flash, however, cannot readily be removed in this maimer. More particularly, vertical flash extends from surfaces on the as-forged connecting rod having different relative elevations. This feature necessitates the use of a relatively complicated and time-consuming sanding procedure to remove the vertical flash. The sanding procedure is typically performed on complex machinery costing $ 1,000,000 or more.

An ongoing need therefore exists for an improved process for removing vertical flash from an as-forged connecting rod. A process that requires a minimal amount of time and effort to complete is preferred. In addition, it is highly desirable that the improved process alleviate the need to use costly and complex machinery in the flash-removal process.

SUMMARY OF THE INVENTION

A presently-preferred process for manufacturing a connecting rod comprises placing a heated preform suitable for being formed into the connecting rod into a closed forge die, and forging the preform in a first forging operation while the preform is at a forging temperature to form an as-forged connecting rod having vertical flash extending therefrom. The presently-preferred process also comprises placing the as-forged connecting rod in a second forge die while the as-forged connecting rod is at a temperature substantially equal to the forging temperature, and forging the vertical flash in a second forging operation. The presently-preferred process further comprises removing the as-forged connecting rod from the second forge die, and machining the as-forged connecting rod to predetermined dimensions.

Another presently-preferred process for manufacturing a connecting rod comprises forging a preform in a first forging operation to form an as-forged connecting rod having vertical flash extending therefrom, and forging the vertical flash in a second forging operation to fold the vertical flash onto the as-forged connecting rod. The presently-preferred process also comprises machining the as-forged connecting rod to predetermined dimensions.

Another presently-preferred process for manufacturing a connecting rod comprises forging a preform in a first forging operation to form an as-forged connecting rod having vertical flash extending therefrom, and forging the vertical flash in a second forging operation to form the vertical flash into a bead. The presently-preferred process further comprises machining the as-forged connecting rod to predetermined dimensions.

Another presently-preferred process for manufacturing a connecting rod comprises forming the preform into an as-forged connecting rod having vertical flash formed thereon by forging the preform in a first forging operation, and re-forming the vertical flash by forging the vertical flash in a second forging operation.

Another presently-preferred process for manufacturing a connecting rod comprises forming a preform suitable for being formed into the connecting rod by placing powder metal in a die, compressing the power metal, and then sintering the powder metal. The presently-preferred process also comprises performing a first forging operation to form the preform into an as-forged connecting rod having vertical flash extending therefrom, and performing a second forging operation to re-form the vertical flash.

A presently-preferred process for eliminating vertical flash on an as-forged connecting rod comprises forging the vertical flash onto a surface of the as-forged connecting rod, and rounding the vertical flash to form a radius thereon.

Another presently-preferred process for eliminating vertical flash on a as-forged connecting rod comprises placing the as-forged connecting rod in a forge die, and forging the vertical flash into a bead.

A presently-preferred process for treating vertical flash extending from a surface of an as-forged connecting rod by a distance comprises placing the as-forged connecting rod in a forge die, and forging the vertical flash to reduce the distance by which the vertical flash extends from the as-forged connecting rod.

BRIEF DESCRIPTION OF THE DRAWINGS

The foregoing summary, as well as the following detailed description of a presently-preferred process, is better understood when read in conjunction with the appended drawings. For the purpose of illustrating the invention, the drawings depict a connecting rod that is capable of being manufactured in accordance with a presently-preferred process provided by the invention. The invention is not limited, however, to use with the specific type of connecting rod disclosed in the drawings. In the drawings.

a portion of an upper punch and a lower punch of a closed forge die capable of forming the preform into the as-forged connecting rod, as the upper punch progresses through its downward stroke;

FIGS. 4A–4E are sequential cross-sectional views of (i) an as-forged connecting rod formed in accordance with the process shown in FIGS. 3A–3E and (ii) a portion of an upper punch and a lower punch of a second forge die capable of eliminating vertical flash on the as-forged connecting rod, as the upper punch progresses through its downward stroke;

FIGS. 5A–5D are sequential cross-sectional views of (i) the preform shown in FIGS. 3A–3E and (ii) a portion of an upper punch and a lower punch of an alternative closed forge die capable of forming the preform into an as-forged connecting rod, as the upper punch progresses through its downward stroke; and FIGS. 6A–6E are sequential cross-sectional views of (i) an as-forged connecting rod formed in accordance with the process shown in FIGS. 5A–5D and (ii) a portion of an upper punch and a lower punch of an alternative second forge die capable of eliminating vertical flash on the as-forged connecting rod, as the upper punch travels through its downward stroke.

DESCRIPTION OF PREFERRED EMBODIMENTS

The invention provides a presently-preferred process for eliminating vertical flash on an as-forged connecting rod of the type used in internal combustion engines. The invention also provides a presently-preferred process for manufacturing a connecting rod. The invention is described with reference to a connecting rod having a particular configuration. This connecting rod is described in detail for exemplary purposes only, as the invention can be applied to connecting rods of virtually any configuration.

Figure 1:
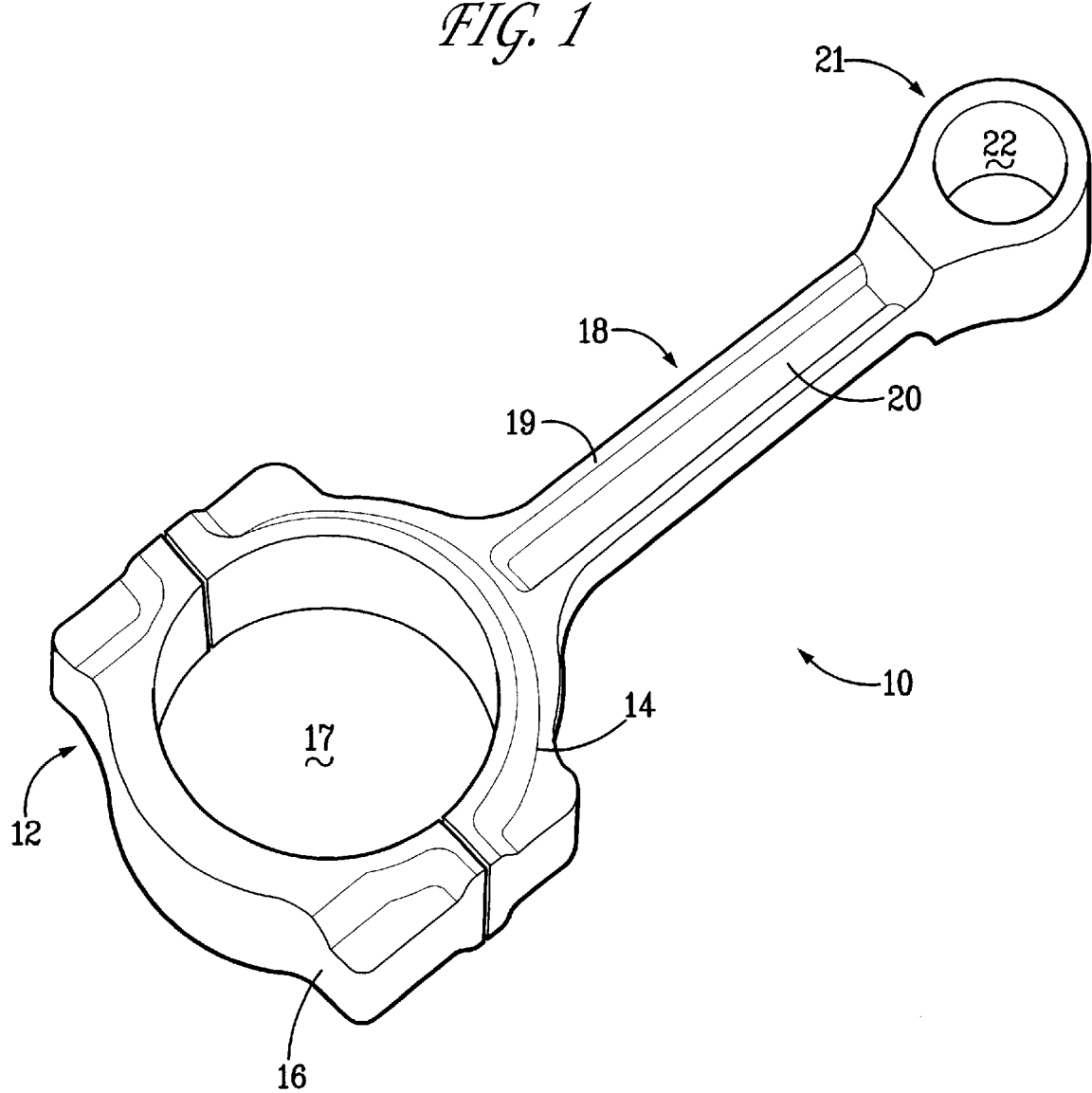
FIG. 1 is a perspective view of a connecting rod manufactured in accordance with a presently-preferred process provided by the invention.

FIG. 1 depicts a connecting rod 10 manufactured in accordance with a presently-preferred process provided by the invention. The connecting rod 10 comprises a crank end 12 having a fork 14 and a cap 16. A crankshaft bore 17 extends through the crank end 12. The connecting rod 10 further comprises a body portion 18 that adjoins the crank end 12. The body portion 18 comprises longitudinal ribs 19 separated by a web portion 20. This configuration gives the body portion 18 a substantially I-shaped cross-section. The connecting rod 10 further comprises a pin end 21 having a wrist-pin bore 22 formed therein.

Figure 2B:
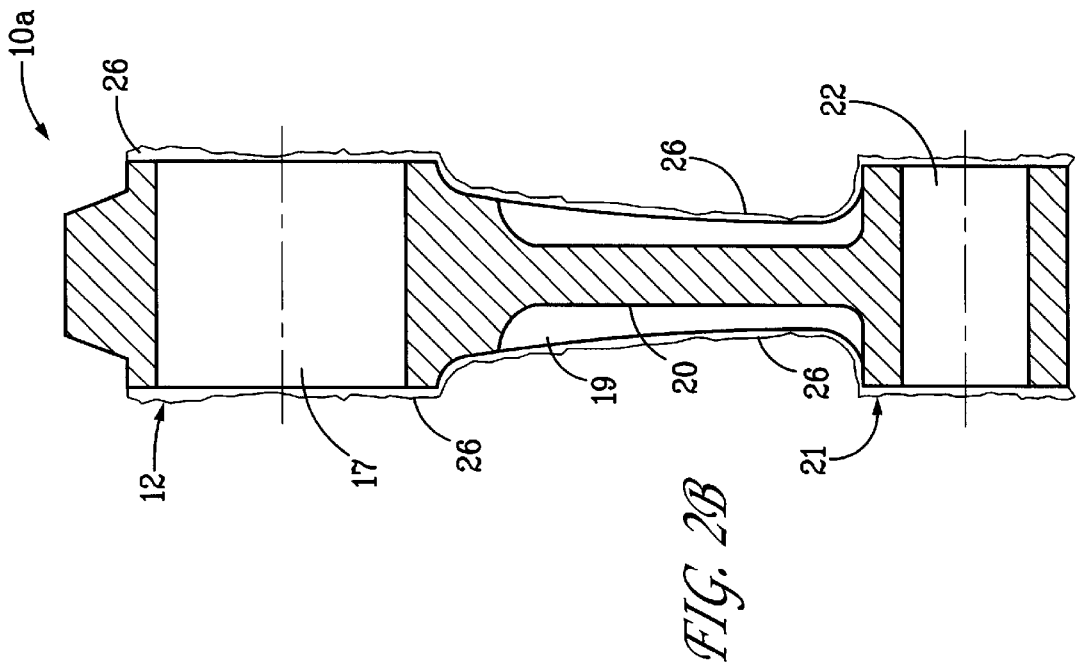
FIG. 2B is a cross-sectional side view of the as-forged connecting rod shown in FIG. 2A.
Figure 2A:
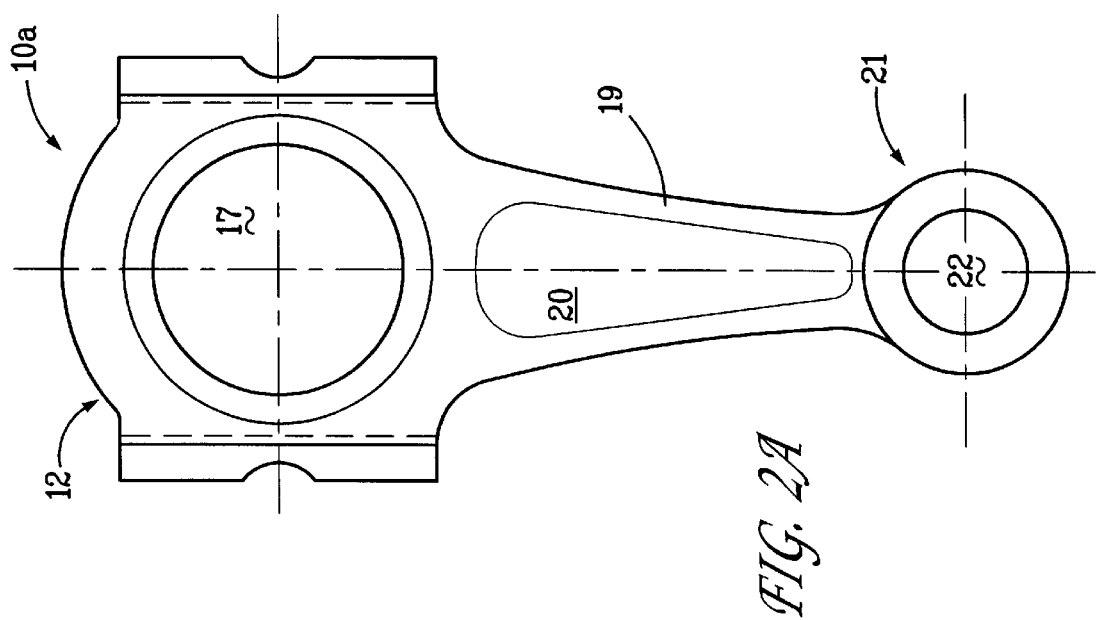
FIG. 2A is a front view of an as-forged connecting rod capable of being formed into the connecting rod shown in FIG. 1.

The connecting rod 10 is formed from an as-forged connecting rod 10a shown in FIGS. 2A and 2B. Features common to both the as-forged connecting rod 10a and the finished connecting rod 10 are denoted by identical reference numerals in the figures. The as-forged connecting rod 10a is formed from a preform 11 (see FIGS. 3A–3E). The preform 11 is formed by placing a mixture of powder metal in a briquetting die. The briquetting die compresses the powder metal to mechanically bond the metal particles within the powder, thereby forming the preform 11. The preform 11 is then sintered at a temperature of, for example, approximately 1,800 degrees Fahrenheit.

The finished preform 11 is placed in a closed forge die 50 while the preform 11 is still at or near the sintering temperature. The forge die 50 comprises a movable die, or upper punch 52, and a stationary die, or lower punch 54. FIGS. 3A–3E are cross-sectional views showing portions of the upper and lower punches 52, 54 and the preform 11. The lower punch 54 is spaced apart from and faces the upper punch 52. Opposing surfaces 52a, 54a on the upper and lower punches 52, 54 define a volume 56 that accommodates the preform 11. The surfaces 52a, 54a are coated with a protective lubricant such as graphite before the preform 11 is placed in the forge die 50 (the protective lubricant may alternatively be placed directly on the preform). The preform 11 is formed into the as-forged connecting rod 10a by a downward stroke of the upper punch 52, as depicted sequentially in FIGS. 3A–3E. Note: The "downward" direction coincides with the arrow 8 appearing in the figures. Directional terms throughout the specification and claims are used for illustrative purposes only and, unless otherwise noted, are not intended to limit the scope of the claims in any manner.

Figure 3A:
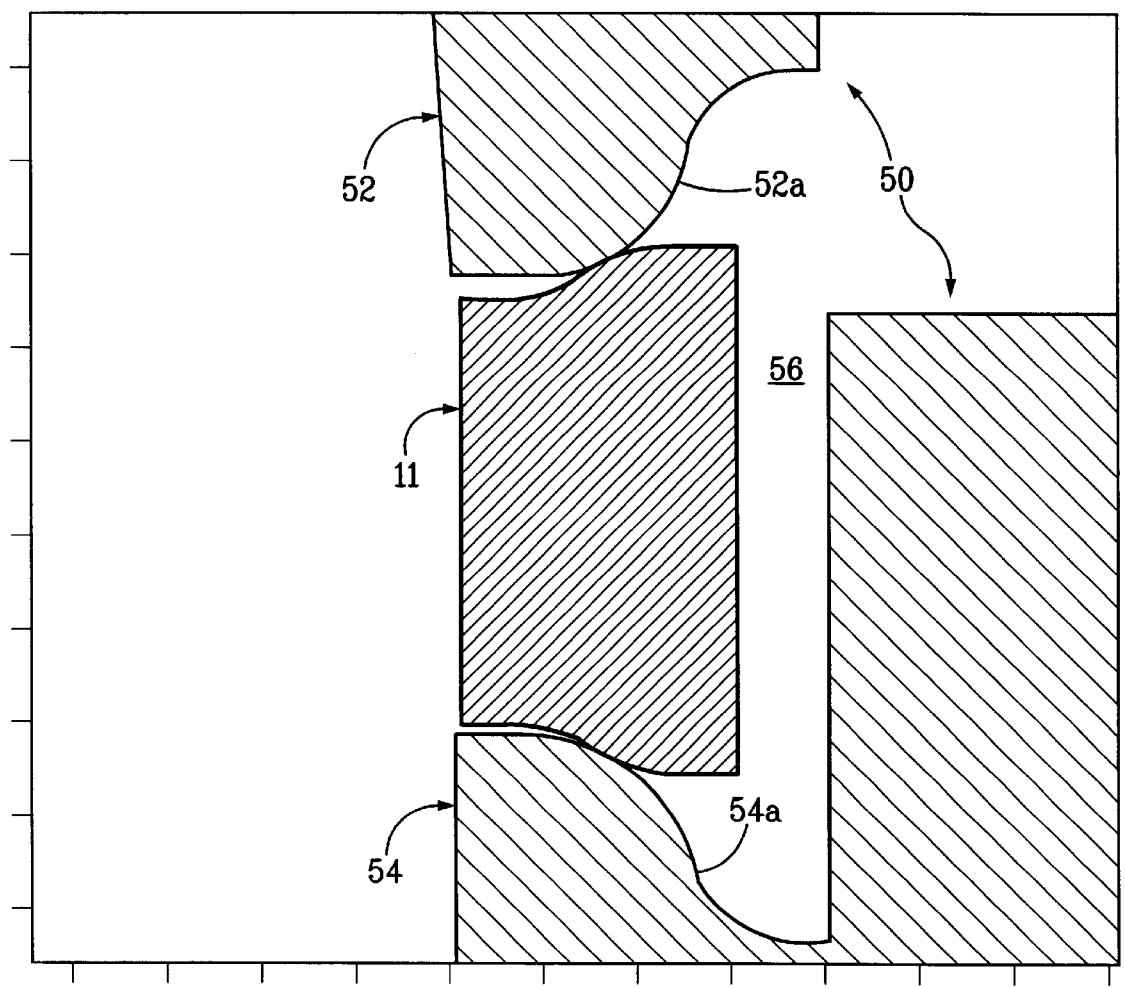
FIGS. 3A–3E are sequential cross-sectional views of (i) a portion of a preform capable of being formed into the as-forged connecting rod shown in FIGS. 2A and 2B and (ii)
Figure 3B:
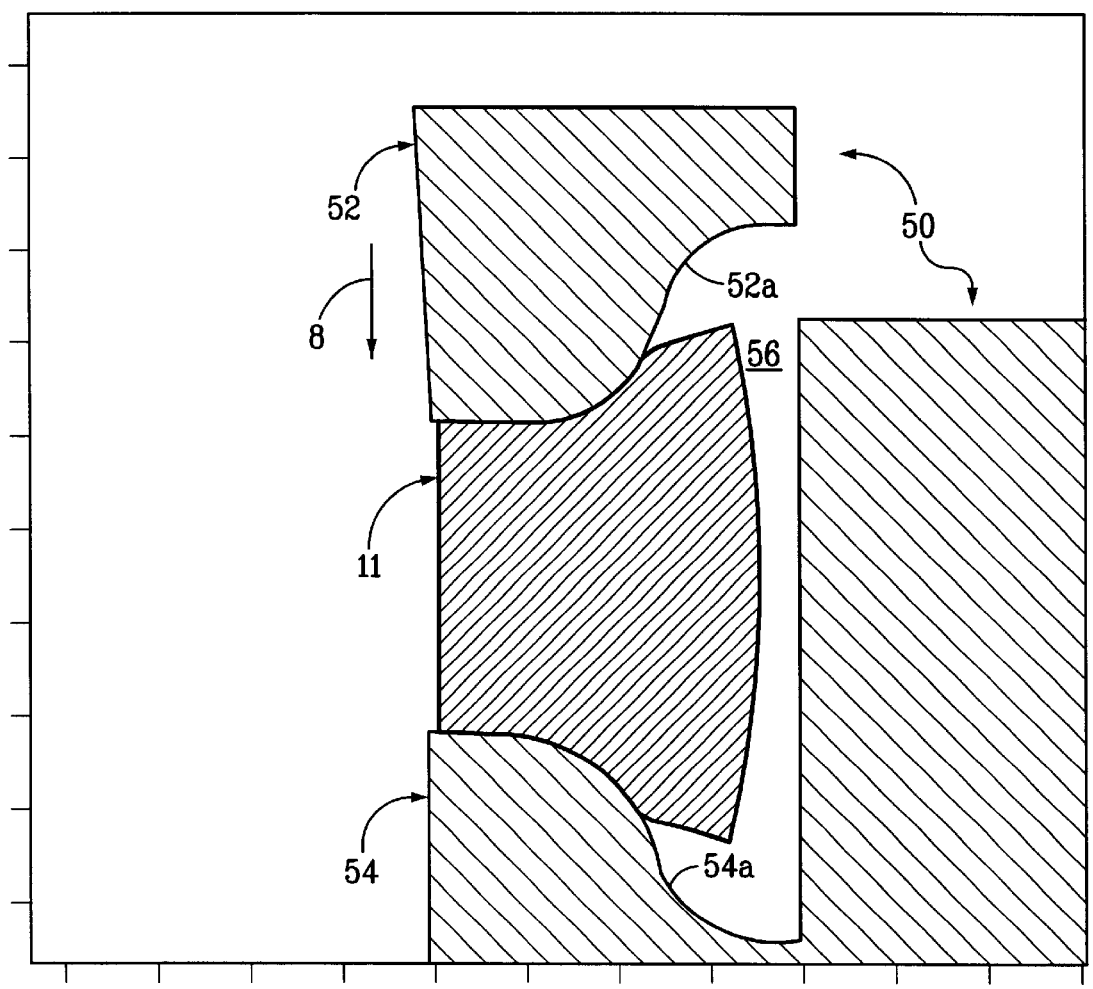
Figure 3C:
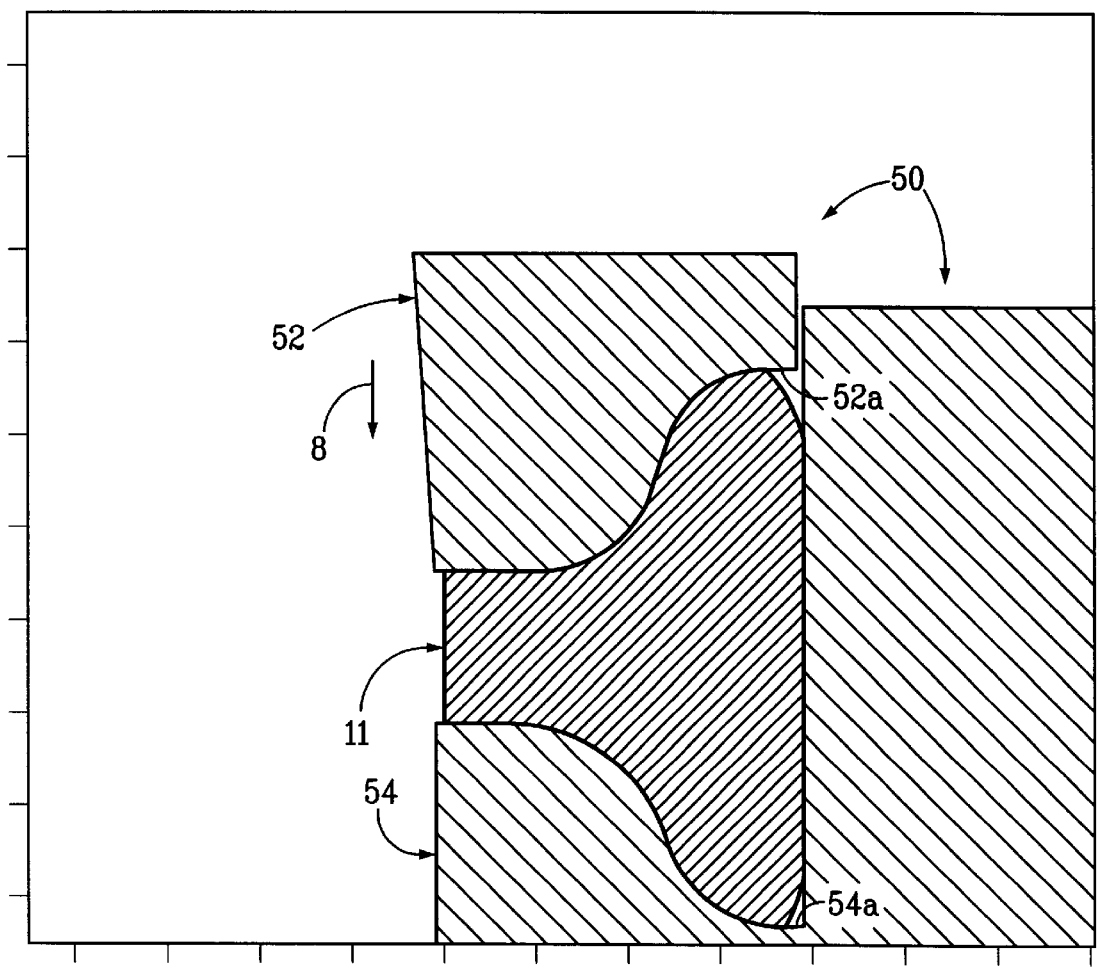
Figure 3D:
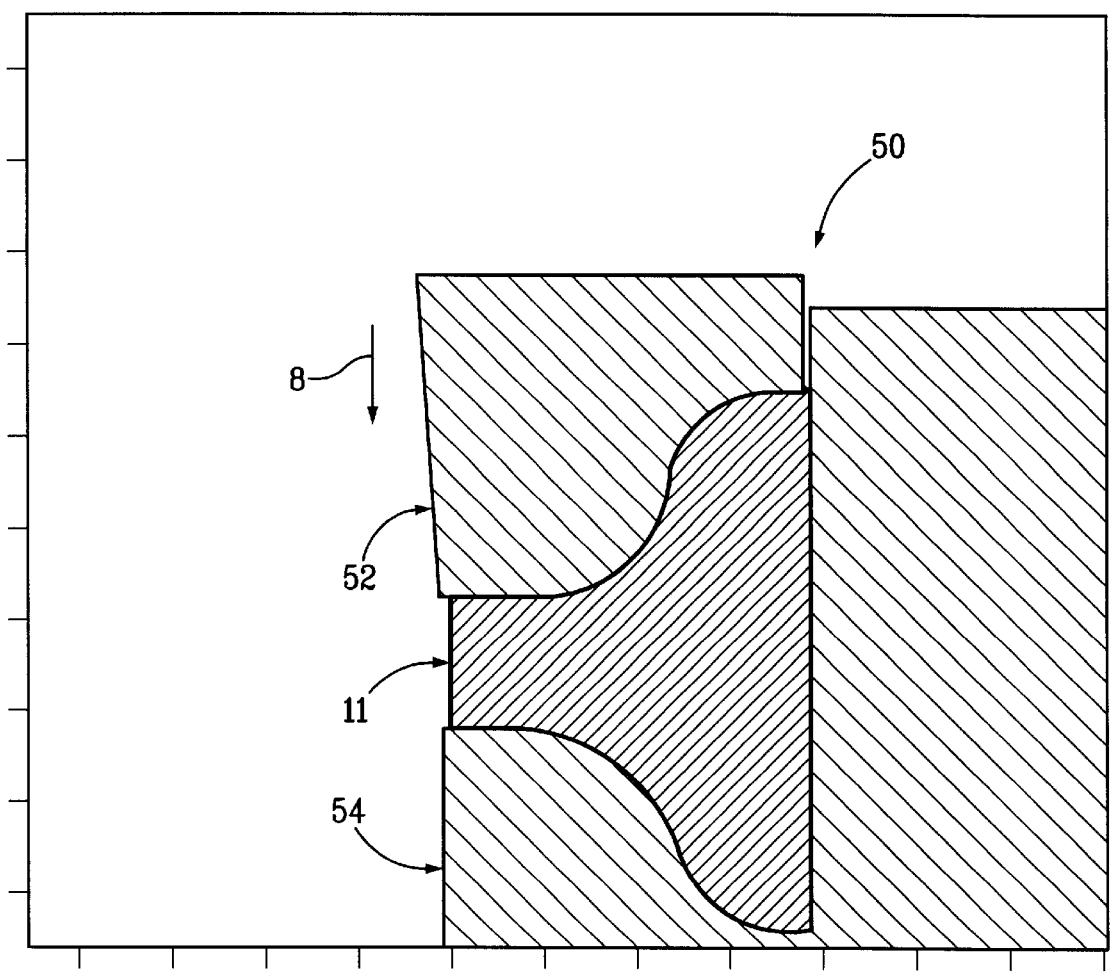
Figure 3E:
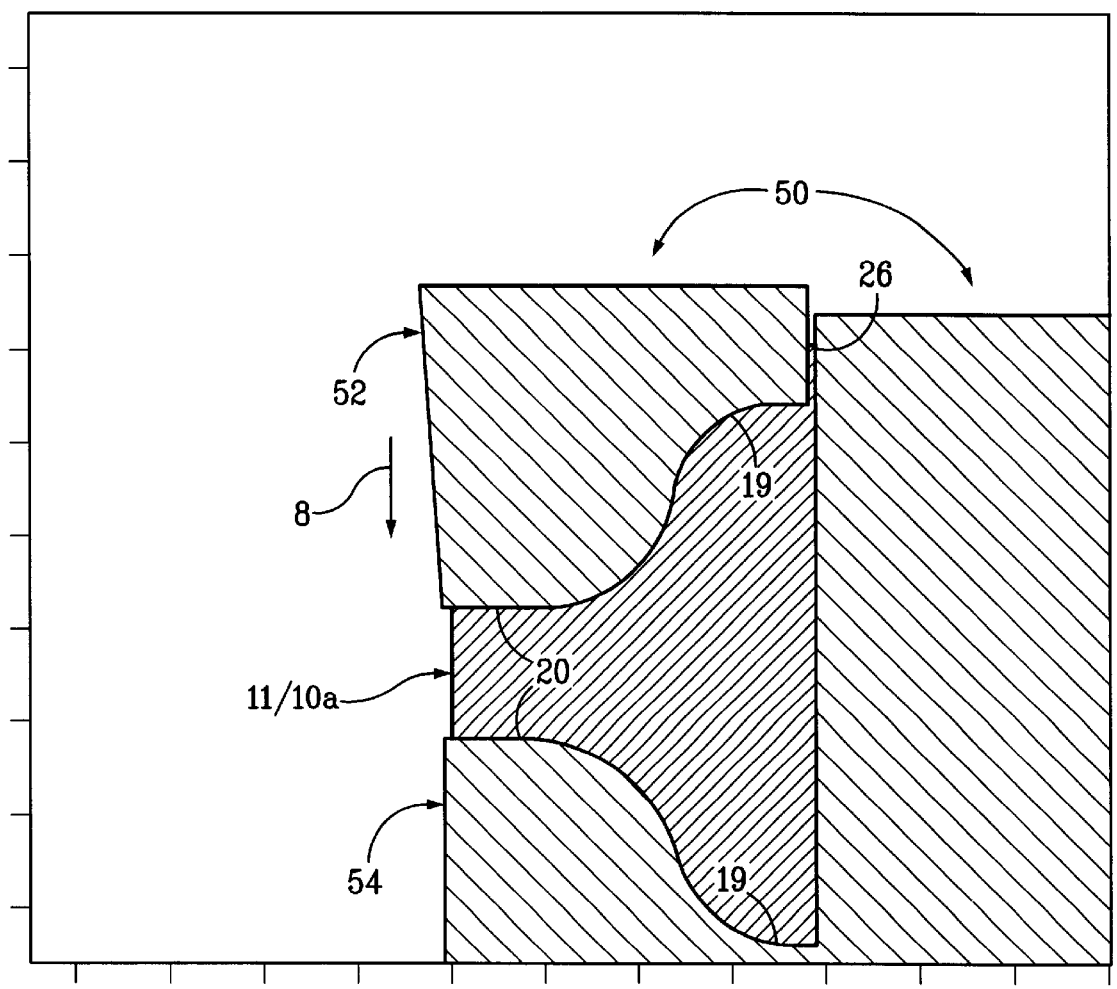

The as-forged connecting rod 10a has vertical flash 26 extending therefrom as a result of the displacement of material within the preform 11 during the forging process, as shown in FIG. 3E. (Any horizontal flash that may be present on the as-forged connecting rod 10a is not shown in the figures, for clarity. Furthermore, although the vertical flash 26 is shown as extending from upper surfaces of the as-forged connecting rod 10a, the presently-preferred process provided by the invention can also be used to eliminate vertical flash extending from lower surfaces of an as-forged connecting rod such as the as-forged connecting rod 10a.)

The vertical flash 26 is eliminated by performing another forging operation on the as-forged connecting rod 10a. More particularly, the as-forged connecting rod 10a is placed in a second forge die 60 immediately after being formed. The forge die 60 has a movable upper punch 62, and a stationary lower punch 64 spaced apart from and facing the upper punch 62. FIGS. 4A–4E are cross-sectional views showing portions of the upper and lower punches 62, 64 and the preform 10a. The upper punch 62 has an inner surface 62a, that includes a top portion 62b and a side portion 62c (see FIG. 4A). The top portion 62b is oriented at an angle α with respect to the horizontal (x) direction. This angle is hereinafter referred to as the "top angle" of the upper punch 62. The side portion 62c is oriented at an angle β in relation to the vertical (y) direction. This angle is hereinafter referred to as the "lead-in angle" of the upper punch 62. The significance of these features is addressed below.

The upper punch 62 is adapted to forge the vertical flash 26 over and onto the as-forged connecting rod 10a while the as-forged connecting rod 10a is still at or near the forging temperature (1,800 degrees Fahrenheit in the exemplary process described herein). The re-forged vertical-flash material is rounded to form a radius thereon as the upper punch 62 reaches the bottom of its stroke. Skilled connecting-rod designers may refer to this sequence of activities as a "curling," "coining," or "crowning" operation.

Figure 4A:
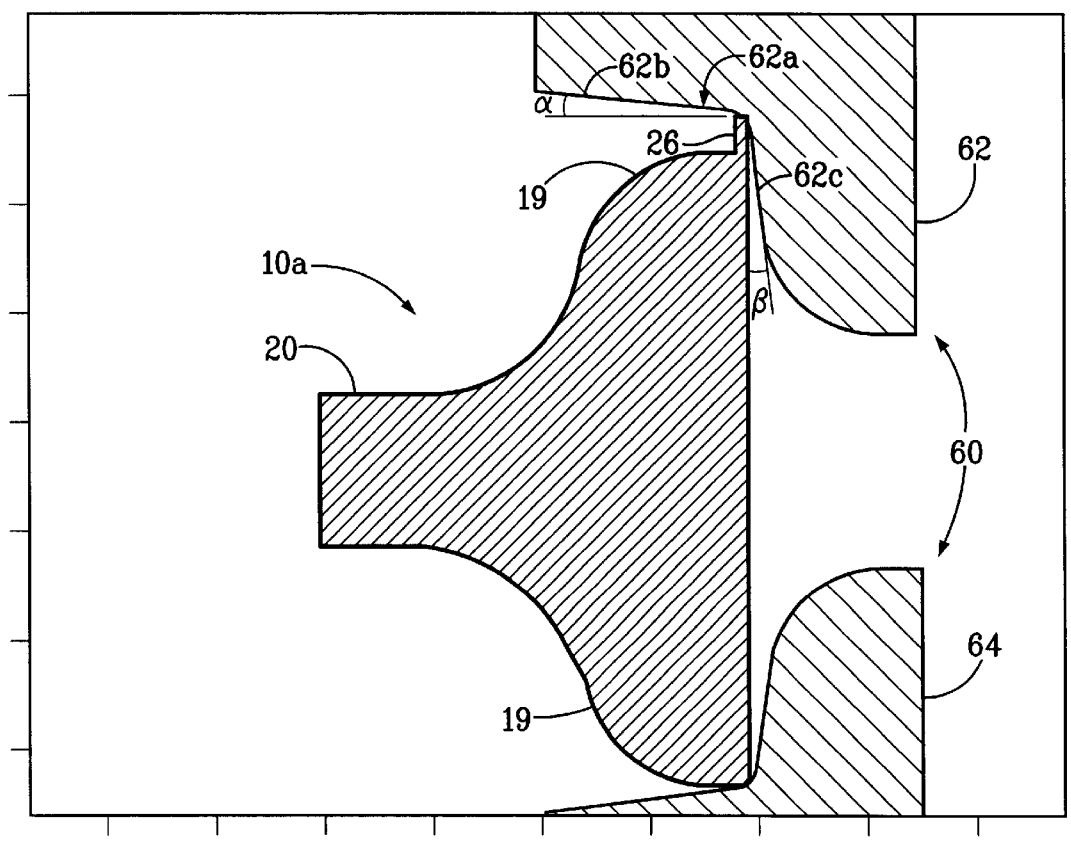
Figure 4B:
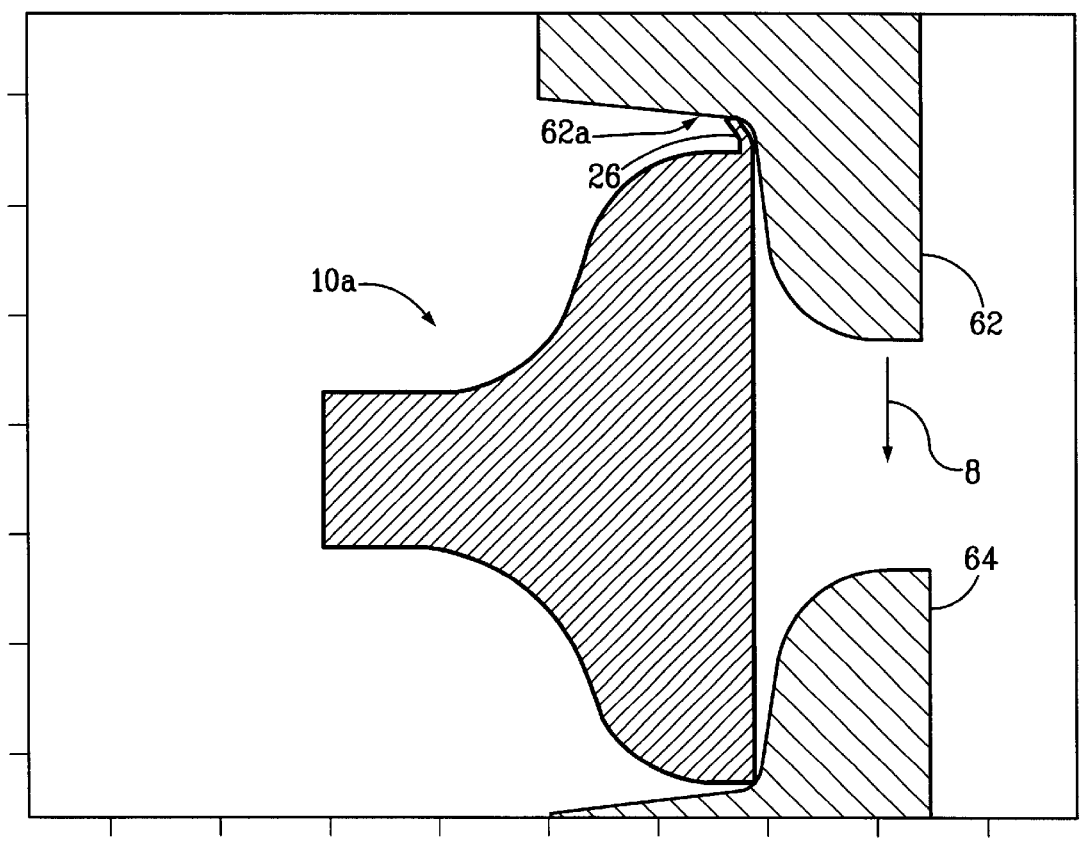
Figure 4C:
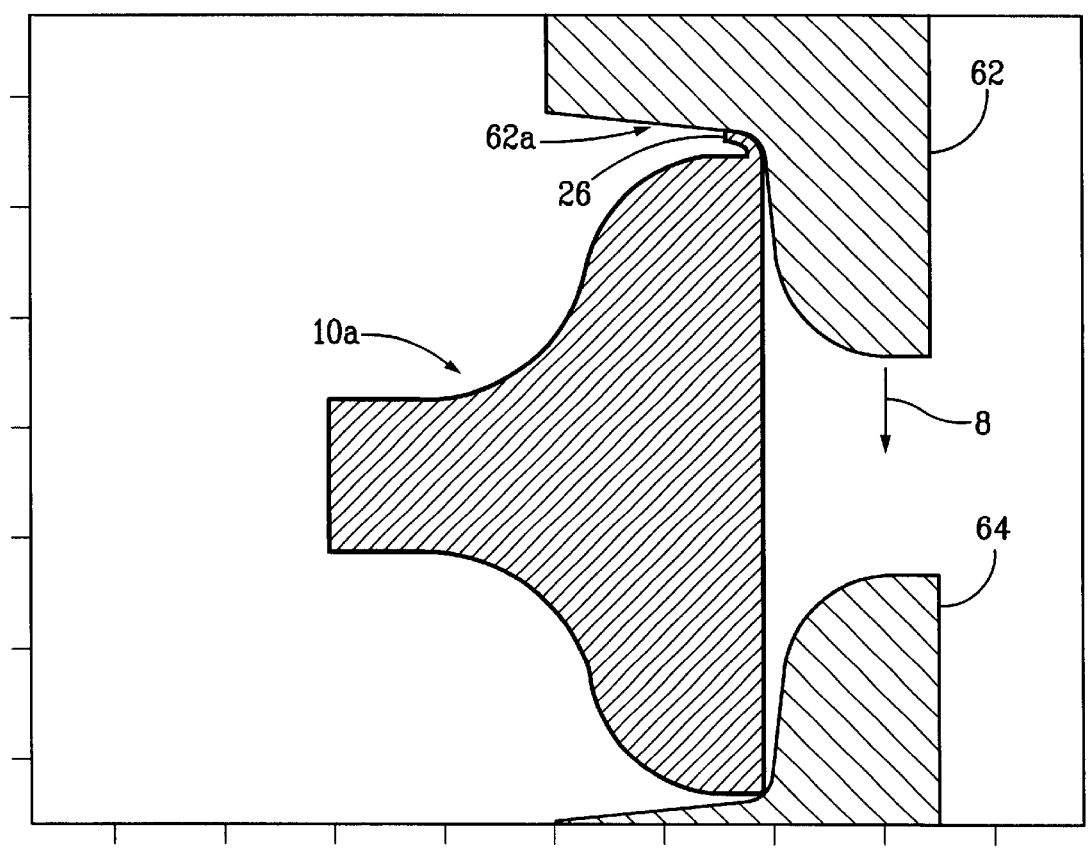
Figure 4D:
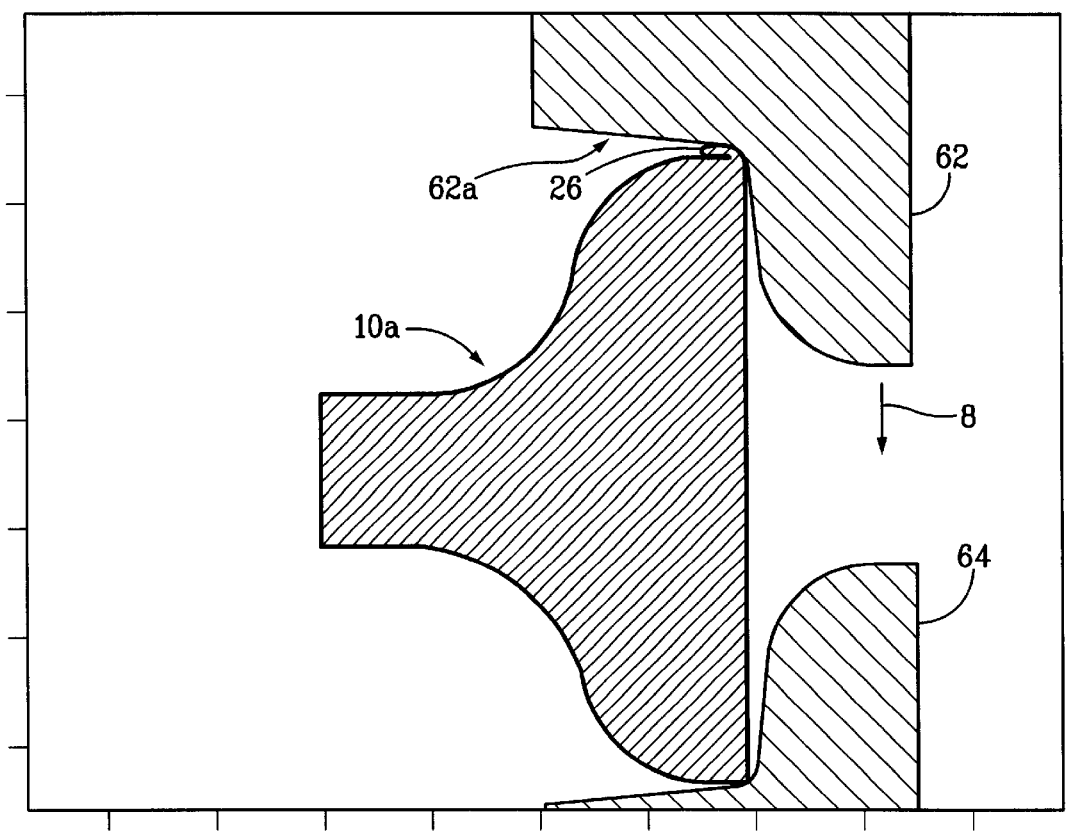
Figure 4E:
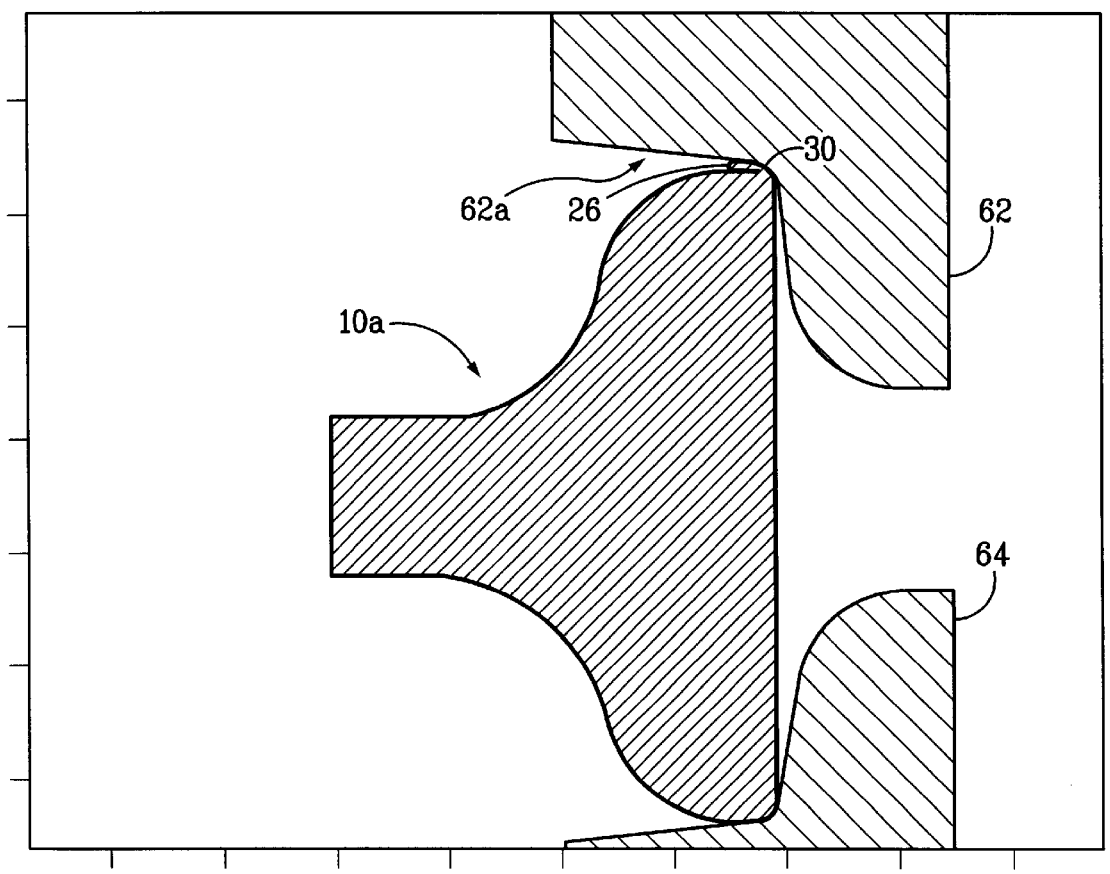
Figure 5A:
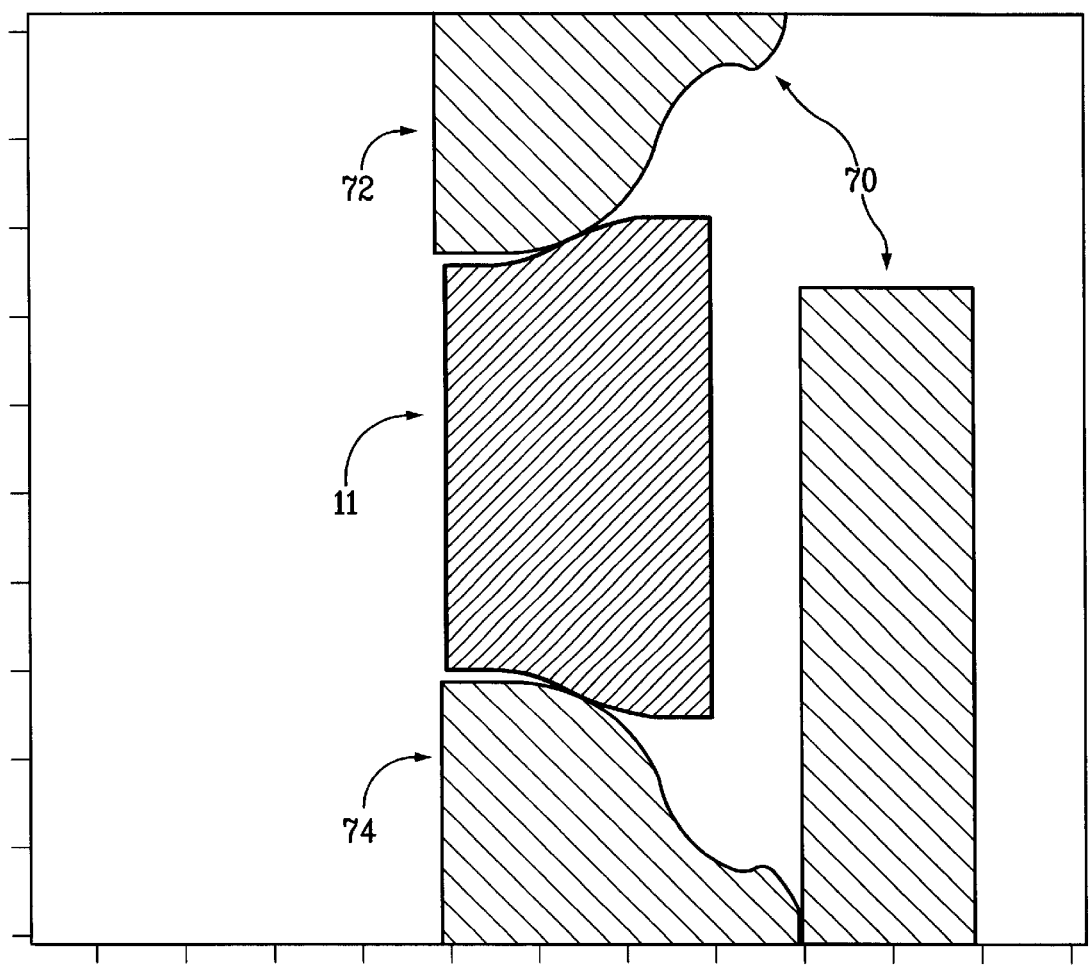
Figure 5B:
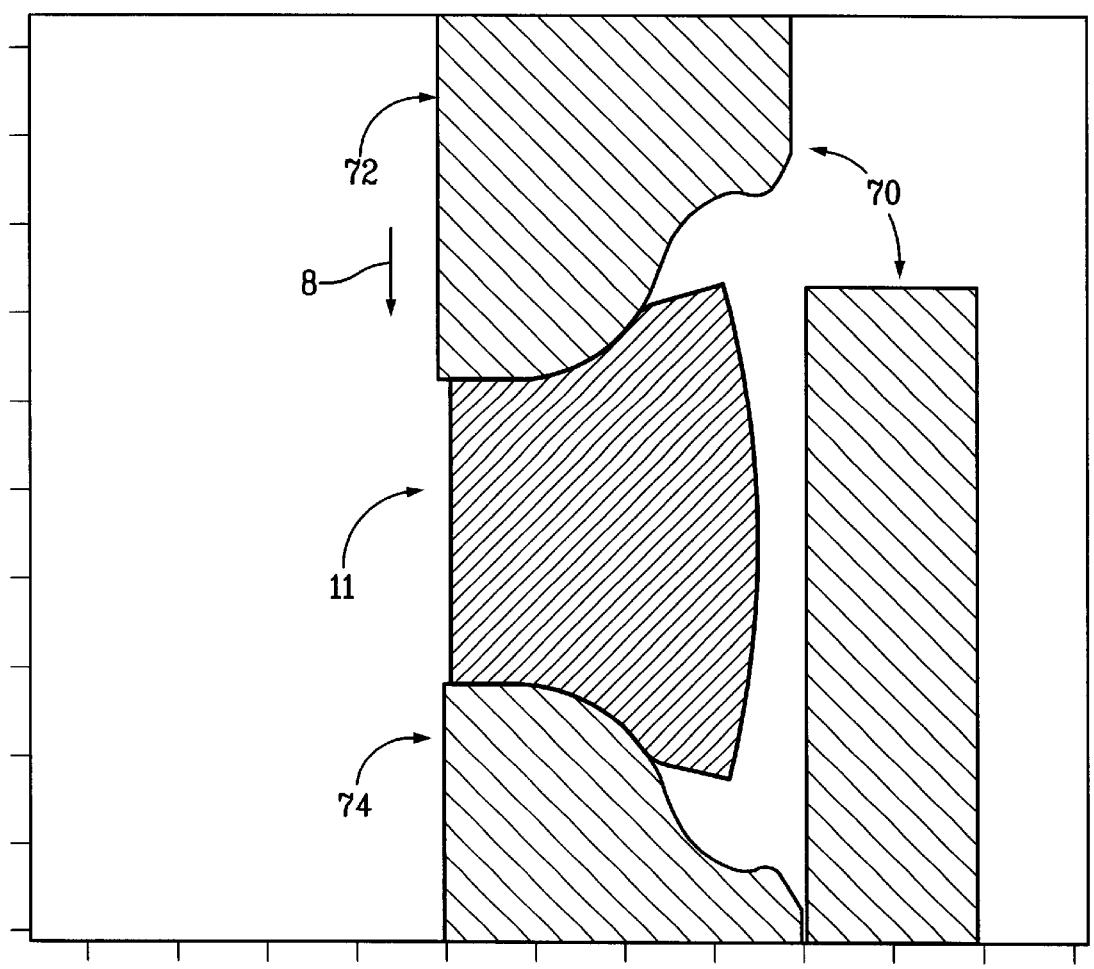
Figure 5C:
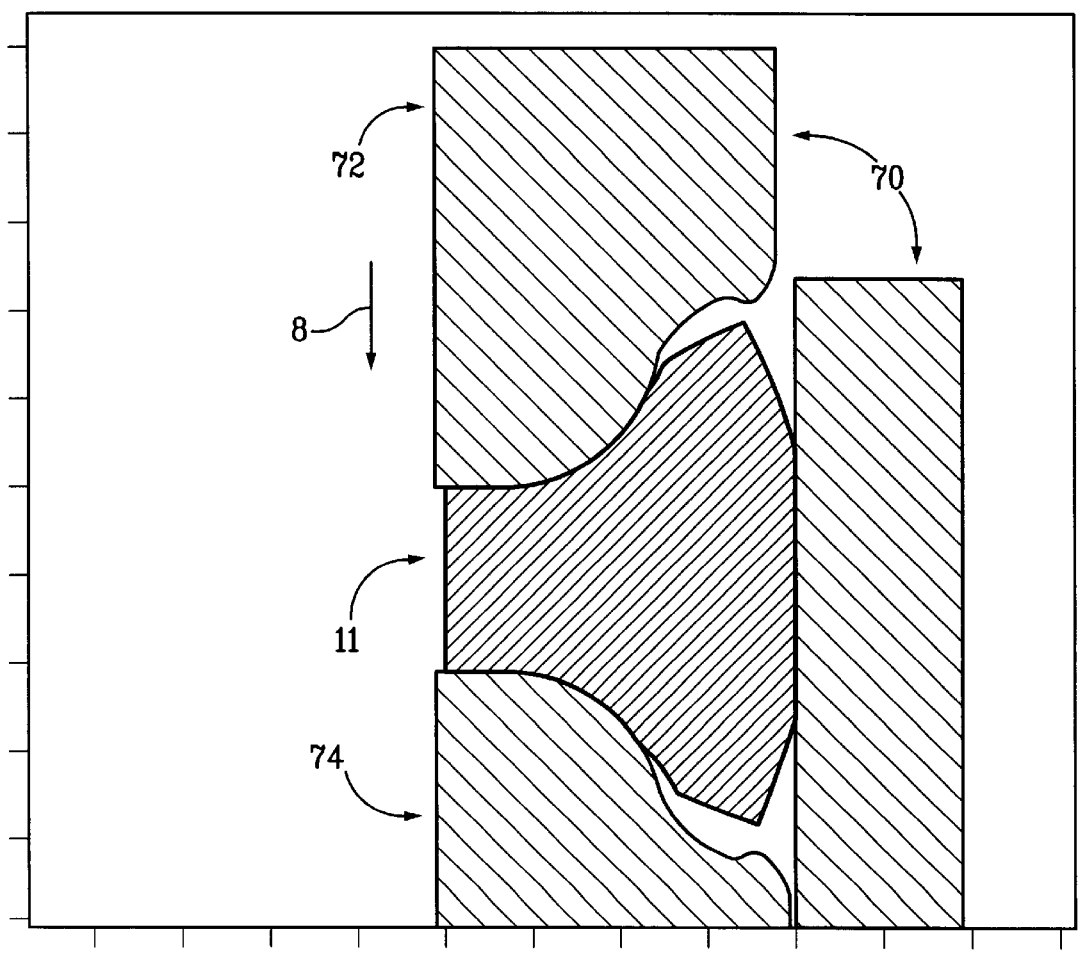
Figure 5D:
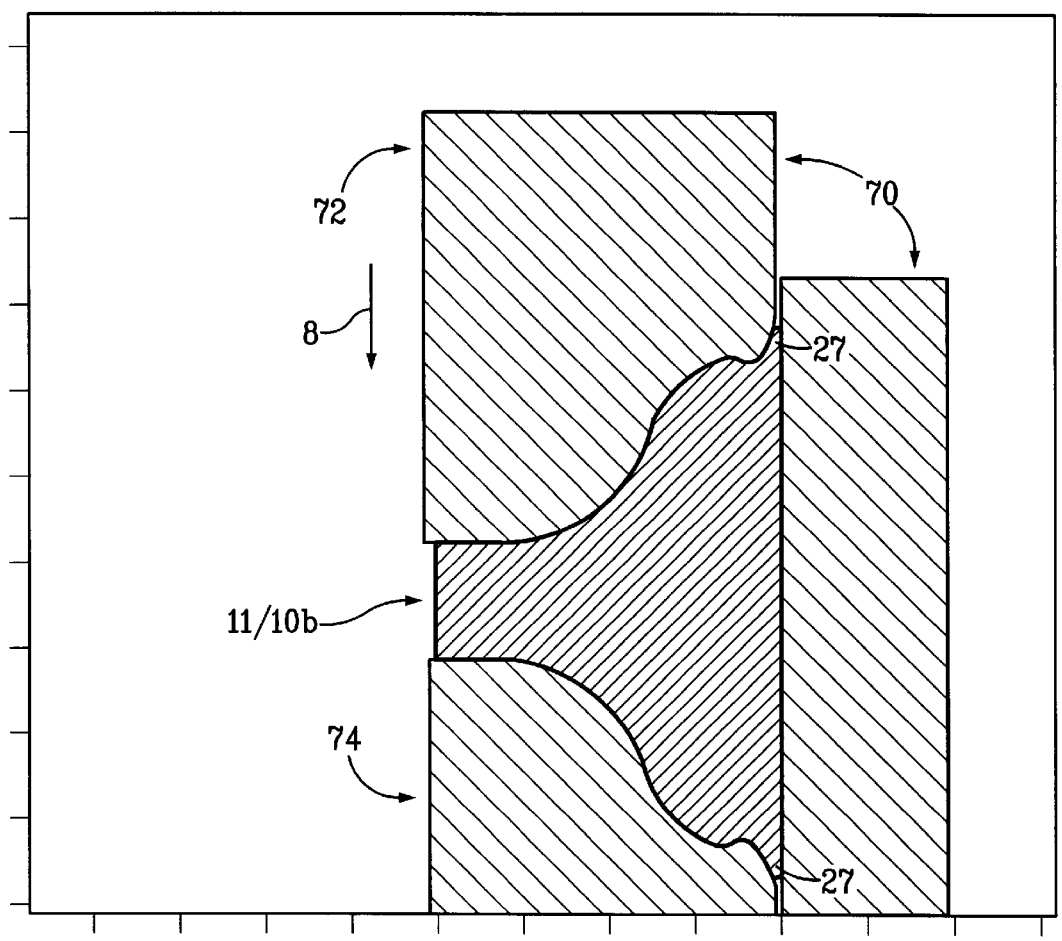
Figure 6A:
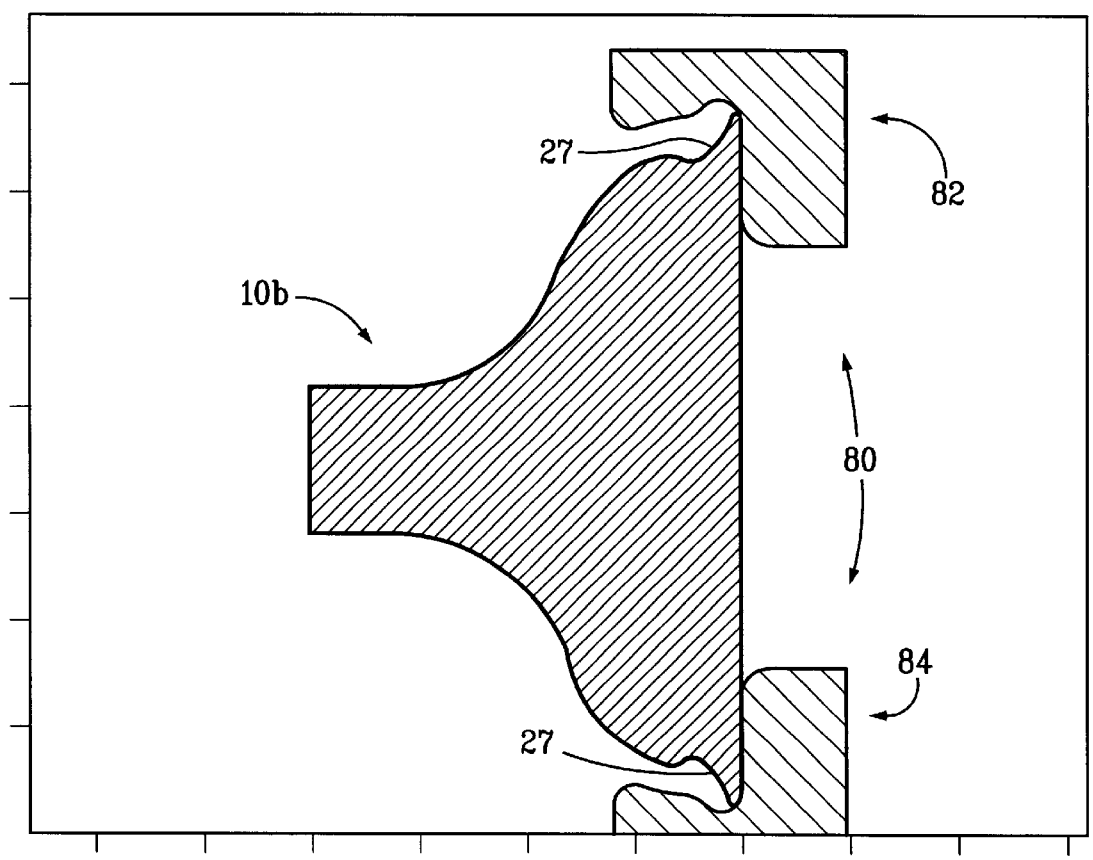
Figure 6B:
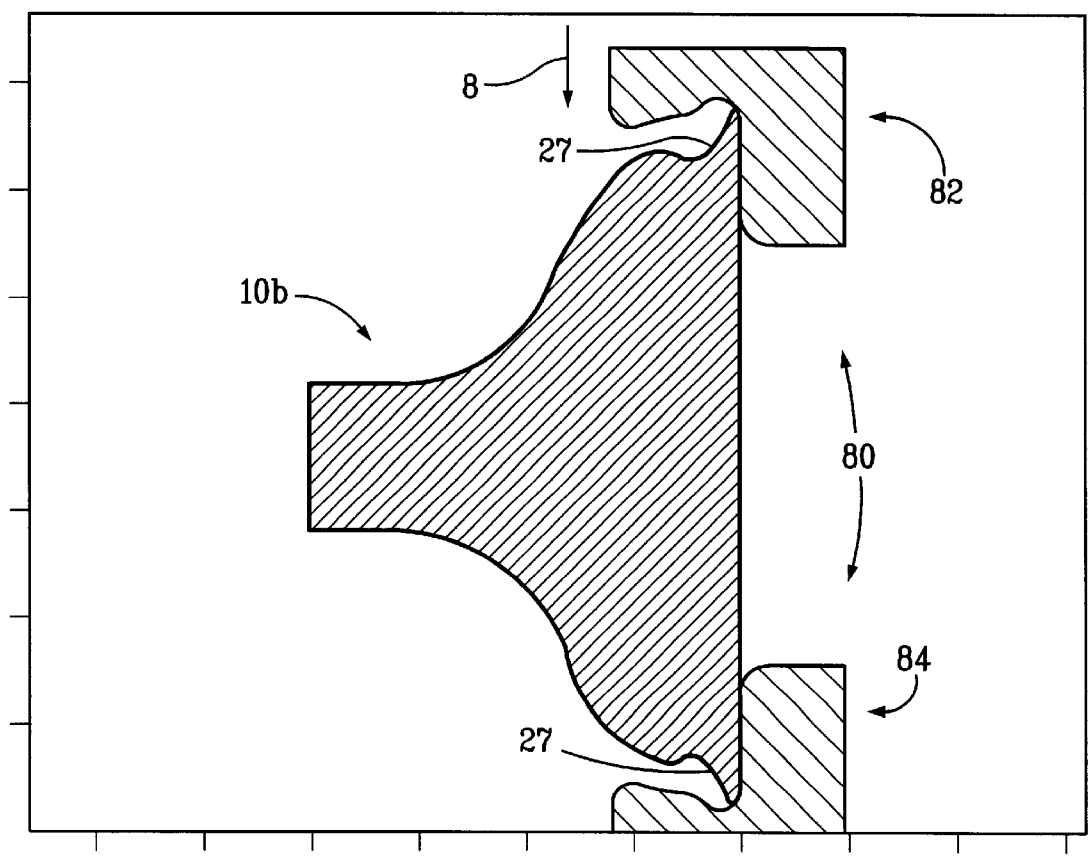
Figure 6C:
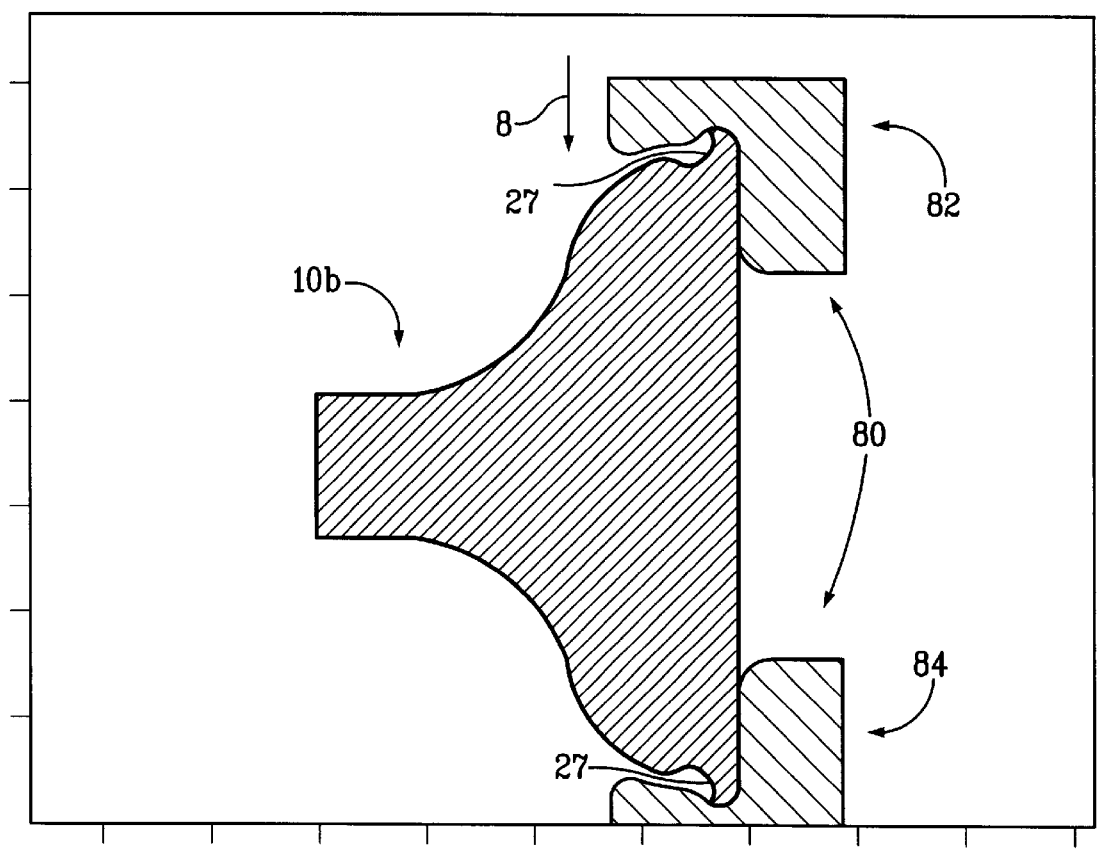
Figure 6D:
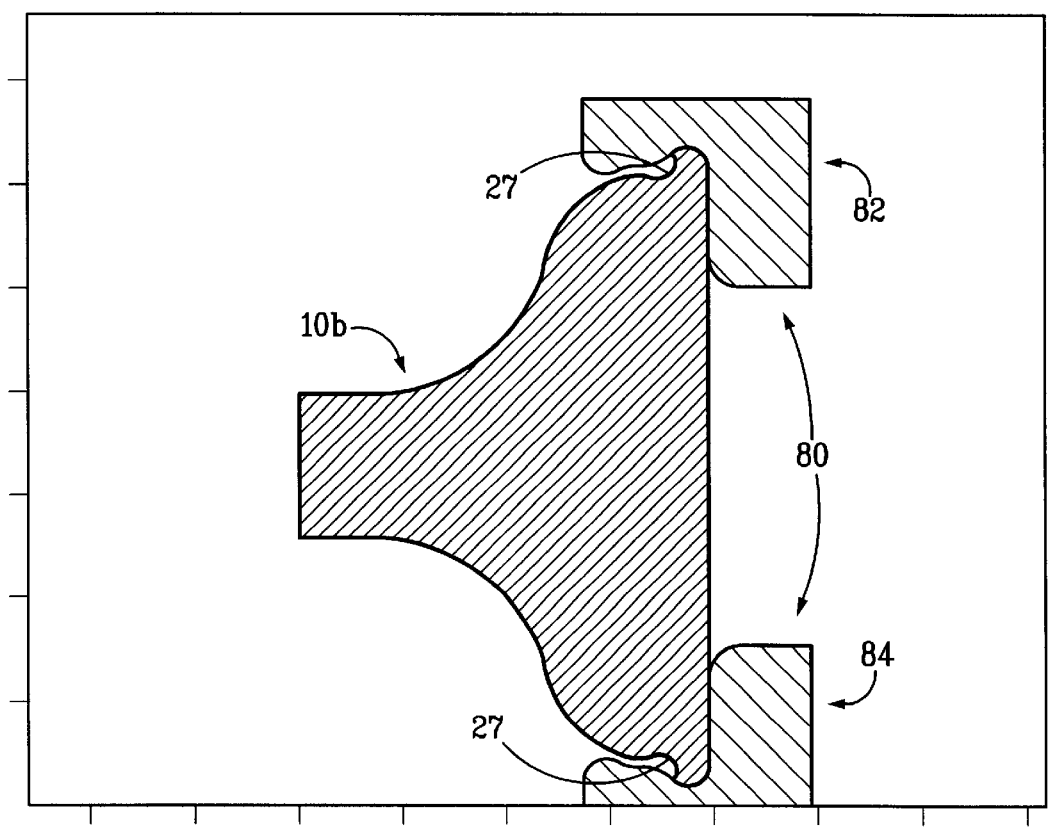
Figure 6E:
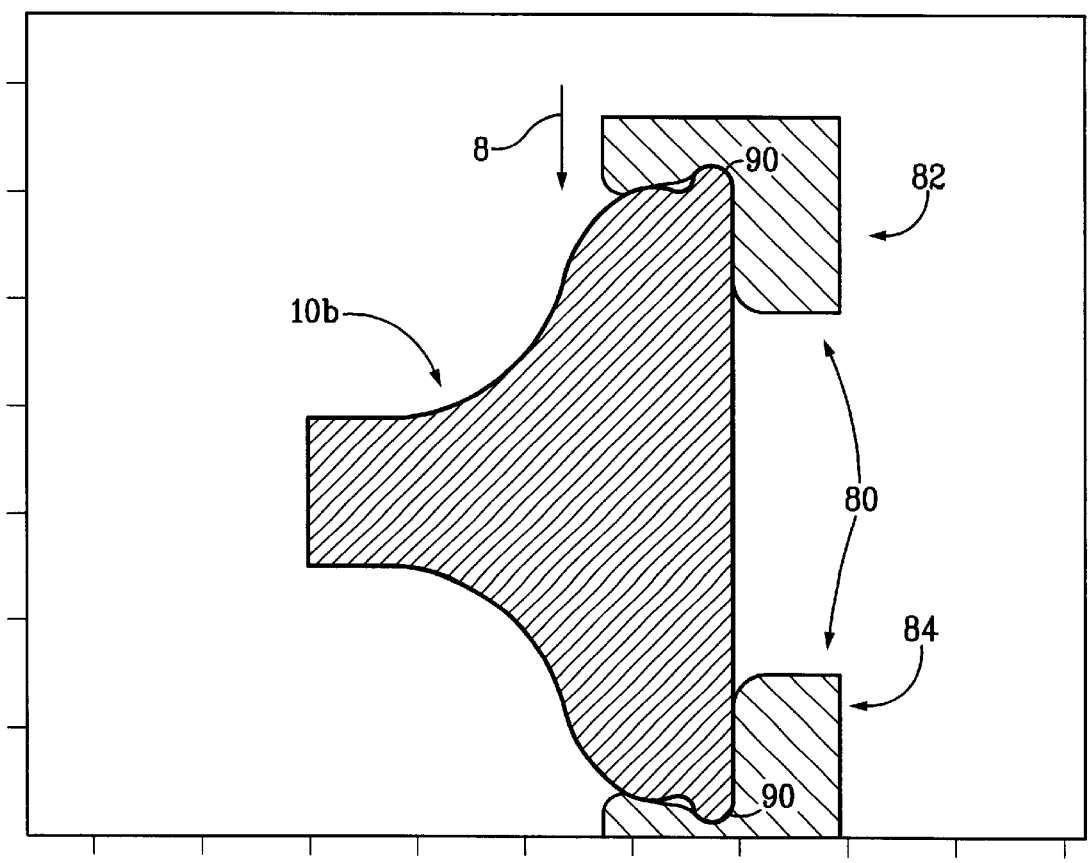

The above-described process for eliminating vertical flash from the as-forged connecting rod 10a is depicted sequentially in FIGS. 4A–4E. FIG. 4A shows a portion of the as-forged connecting rod 10a and the forge die 60 as the as-forged connecting rod 10a is placed in the forge die 60, i.e., before the upper punch 62 has started its downward stroke. FIG. 4B depicts the upper punch 62 beginning its stroke. FIG. 4C shows the upper punch approximately halfway through its stroke, and FIG. 4D shows the upper punch 62 nearing the end of its stroke. FIG. 4E shows the upper punch 62 at the bottom of its stroke, as the upper punch 62 forms a radius 30 in the vertical-flash material. The radius 30 is preferably no greater than approximately 0.030 inches to prevent undue dimensional variations in the finished connecting rod 10.

FIGS. 4A–4E, viewed in sequence, demonstrate that the presently-preferred process provided by the invention comprises folding or rolling the vertical flash 26 onto an adjacent surface of the as-forged connecting rod 10a, e.g., a surface of the rib 19 of the body portion 18, and then forming a radius in the folded or rolled material. (Note: The terms "folding" and "rolling" are hereinafter used interchangeably in the specification and claims.) In other words, Applicant has developed a preferred process for eliminating vertical flash that involves re-forming the vertical flash in a manner that permits the material to remain on the as-forged connecting rod 10a (and the connecting rod 10). Hence, unlike conventional processes for eliminating vertical flash, the preferred process does not require removal, i.e., physical separation, of the vertical flash 26 from the connecting rod 10. The substantial advantages associated with this development are discussed below.

The lead-in angle β of the upper punch 62 is preferably approximately six degrees to account for part-to-part dimensional variations in the as-forged connecting rod 10a. The optimal value for the top angle α is dependent upon the height of the vertical flash 26 which, in turn, is dependent upon geometry of the volume 56 in the forge die 50. Relatively large part-to-part variations in the vertical flash 26 and the dimensions of the as-forged connecting rod 10a can be accommodated by increasing the top and lead-in angles.

Note: The flash-eliminating process has been illustrated and described in connection with the body portion 18 of the as-forged connecting rod 10a for exemplary purposes only. The forge die 60 is adapted to perform the above-described process on each portion of the as-forged connecting rod 10a on which the vertical flash 26 is present, including the crank end 12 and the pin end 21.

The as-forged connecting rod 10a is formed into the finished connecting rod 10 in a conventional manner after the vertical flash 26 has been removed using the above-described process. For example, any horizontal flash present on the as-forged connecting rod 10a may be removed by stamping or shearing the horizontal flash from the as-forged connecting rod 10a. Other finishing activities include machining the as-forged connecting rod 10a to its final dimensions, and separating the end cap 16 from the as-forged connecting rod 10a by, for example, sawing, laser cutting, or fracturing the cap from the fork. Further details relating to the finishing operation are not necessary to an understanding of the invention and, therefore, not discussed herein.

The presently-preferred process provided by the invention, as previously noted, provides substantial advantages over conventional processes for removing vertical flash from an as-forged connecting rod such as the as-forged connecting rod 10a. For example, the preferred process permits the vertical-flash material 26 to remain on the as-forged connecting rod 10a, and thus eliminates the need to physically remove this material from the as-forged connecting rod 10a. Physical removal of vertical-flash, as explained previously, is typically performed through a complex sanding operation that requires the use of expensive machinery. Forging the vertical-flash material into the as-forged connecting rod 10a using the relatively simple and inexpensive forge die 60 eliminates the need for such machinery. Hence, production costs for connecting rods such as the connecting rod 10 can be substantially reduced through the use of the preferred process. Production times can also be reduced through the use of the preferred process, as the preferred process can be performed in a minimal amount of time. Also, potential down time in the overall production process for the connecting rod 10 can be reduced by eliminating reliance on the relatively complex sanding machinery.

It is to be understood that even though numerous characteristics and advantages of the present invention have been set forth in the foregoing description, together with specific details of a presently-preferred process, the disclosure is illustrative only, and changes may be made in detail, especially in matters of shape, size, and arrangement of the parts, within the principles of the invention to the full extent indicated by the broad general meaning of the terms in which the appended claims are expressed.

For example, the above-described process can be modified so that the vertical-flash material is formed into a bead. This alternative process is depicted in FIGS. 5A–5D and 6A–6E. In accordance with this alternative process, the pre-form 11 is initially placed in a closed forge-die 70 while at or near the sintering temperature. The forge die 70 has a movable upper punch 72 and a stationary lower punch 74. The preform 11 is forged into an as-forged connecting rod 10b by the downward stroke of the upper punch 72, as depicted sequentially in FIGS. 5A–5D. The forging process results in vertical flash 27 having a substantially wedge-shaped cross-section (see FIG. 5D).

The vertical flash 27 is eliminated by performing an additional forging operation on the as-forged connecting rod 10b as follows. The as-forged connecting rod 10b is placed in a second forge die 80 immediately after being formed. The forge die 80 has a movable upper punch 82, and a stationary lower punch 84 spaced apart from and facing the upper punch 82. FIGS. 6A–6E are cross-sectional views showing portions of the upper and lower punches 82, 84 and the preform 11.

The upper punch 82 performs the second forging operation that eliminates the vertical flash 27. More particularly, the upper punch 82 is adapted to forge the vertical flash 27 into a bead 90 that extends along an edge of the as-forged connecting rod 10b, as depicted sequentially in FIGS. 6A–6E. Skilled connecting-rod designers may refer to this sequence of activities as a "crowning" operation.

Other possible variations in the presently-preferred process provided by the invention include, for example, configuring the forge dies 60, 80 to form oil slinger grooves and chamfers into the as-forged connecting rods 10a, 10b as the vertical flash 26, 27 is manipulated in the above-described manner.

What is claimed is:

1. A process for manufacturing a connecting rod, comprising:
    placing a heated perform suitable for being formed into the connecting rod into a closed forge die;
    forging the heated perform in a first forging operation while the heated perform is at a forging temperature to form an as-forged connecting rod having vertical flash extending therefrom;
    placing the as-forged connecting rod into a second forge die and forging the vertical flash in a second forging operation while the as-forged connecting rod is at a temperature approximately equal to the forging temperature, the second forging operation comprising folding the vertical flash onto the as-forged connecting rod and subsequently forming a radius in the vertical flash;
    removing the as-forged connecting rod from the second forge die; and
    machining the as-forged connecting rod to predetermined dimensions.

2. The process of claim 1, wherein forging the vertical flash in a second forging operation comprises at least one of curling, coining, and crowning the vertical flash.

3. The process of claim 1, wherein forging the vertical flash in a second forging operation comprises forming the vertical flash into a bead.

4. The process of claim 3, wherein forging the vertical flash in a second forging operation comprises crowning the vertical flash.

5. The process of claim 1, wherein forging the heated preform in a first forging operation while the heated preform is at a forging temperature comprises forging the heated preform while the heated preform is at a temperature of approximately 1,800 degrees Fahrenheit.

6. The process of claim 1, further comprising forming the heated preform by compressing and then sintering powder metal.

7. The process of claim 1, wherein forging the heated preform in a first forging operation comprises forging the heated preform so that the vertical flash has a wedge-shaped cross-section.

8. The process of claim 7, wherein forging the vertical flash in a second forging operation comprises crowning the vertical flash into a bead.

9. The process of claim 1, further comprising forming at least one of an oil slinger groove and chamfer in the as-forged connecting rod while forging the vertical flash in the second forging operation.

10. A process for manufacturing a connecting rod, comprising:
    forging a preform in a first forging operation to form an as-forged connecting rod having vertical flash extending therefrom;
    forging the vertical flash in a second forging operation to fold the vertical flash onto the as-forged connecting rod and subsequently round the vertical flash to form a radius thereon; and
    machining the as-forged connecting rod to predetermined dimensions.

11. A process for eliminating vertical flash on an as-forged connecting rod, comprising:
    folding the vertical flash onto a surface of the as-forged connecting rod; and rounding the vertical flash to form a radius thereon.

12. The process of claim 11, wherein folding the vertical flash onto a surface of the as-forged connecting rod comprises folding the vertical flash onto a surface of the as-forged connecting rod while the as-forged connecting rod is at a temperature of approximately 1,800 degrees Fahrenheit.

13. A process for manufacturing a connecting rod, comprising:
    providing a closed forge die;
    placing a heated perform suitable for being formed into the connecting rod into the closed forge die;
    forging the heated perform in a first forging operation while the heated perform is at a forging temperature to form an as-forged connecting rod having vertical flash extending therefrom;
    providing a second forge die having a curved surface;
    placing the as-forged connecting rod into the second forge die and forging the vertical flash in a second forging operation while the as-forged connecting rod is at a temperature approximately equal to the forging temperature so that the curved surface folds the vertical flash onto the as-forged connecting rod and forms a radius on the vertical flash;
    removing the as-forged connecting rod from the second forge die; and
    machining the as-forged connecting rod to predetermined dimensions.

14. A process for manufacturing a connecting rod, comprising:
    providing a first forge die;
    forging a preform in a first forging operation using the first forge die to form an as-forged connecting rod having vertical flash extending therefrom;
    providing a second forge die having a curved surface;
    forging the vertical flash in a second forging operation using the second forge die so that the curved surface folds the vertical flash onto the as-forged connecting rod; and
    machining the as-forged connecting rod to predetermined dimensions.

* * * * *